(12) United States Patent
Wolff-Petersen et al.

(10) Patent No.: US 9,239,628 B2
(45) Date of Patent: Jan. 19, 2016

(54) METHOD AND APPARATUS FOR ADAPTING APPLICATIONS OVER MULTIPLE DEVICES

(75) Inventors: Jacob Wolff-Petersen, Richmond (GB); Ed Guntin, Barrington, IL (US)

(73) Assignee: STEELSERIES APS, Valby (DK)

( * ) Notice: Subject to any disclaimer, the term of this patent is extended or adjusted under 35 U.S.C. 154(b) by 107 days.

(21) Appl. No.: 13/358,971

(22) Filed: Jan. 26, 2012

(65) Prior Publication Data
US 2013/0196765 A1 Aug. 1, 2013

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| G06F 3/023 | (2006.01) |
| G06F 3/0489 | (2013.01) |

(52) U.S. Cl.
CPC ............ *G06F 3/023* (2013.01); *G06F 3/04895* (2013.01); *A63F 2300/10* (2013.01); *A63F 2300/1018* (2013.01)

(58) Field of Classification Search
CPC ..... A63F 13/23; A63F 13/40; A63F 2300/10; A63F 2300/1018
USPC .......................................... 463/16, 20, 36–37
See application file for complete search history.

(56) References Cited

U.S. PATENT DOCUMENTS

| | | |
|---|---|---|
| 6,693,646 B1 | 2/2004 | Jones |
| 7,679,503 B2 | 3/2010 | Mason |
| 2002/0151366 A1* | 10/2002 | Walker et al. .................. 463/42 |
| 2007/0124372 A1 | 5/2007 | Liu |
| 2007/0259717 A1* | 11/2007 | Mattice et al. ................. 463/36 |
| 2009/0005165 A1* | 1/2009 | Arezina et al. ................. 463/37 |
| 2010/0291913 A1 | 11/2010 | Xu |
| 2011/0257958 A1 | 10/2011 | Kildevaeld |
| 2013/0102390 A1* | 4/2013 | Klein et al. .................... 463/37 |

OTHER PUBLICATIONS

Gamasutra, "Dead Reckoning: Latency Hiding for Networked Games", www.gamasutra.com/view/feature/3230/dead_reckoning_latency_hiding_for_.php; Sep. 19, 1997.

(Continued)

*Primary Examiner* — Milap Shah
*Assistant Examiner* — Jason Pinheiro
(74) *Attorney, Agent, or Firm* — Guntin & Gust, PLC; Douglas Schnabel

(57) ABSTRACT

A method and apparatus that incorporate teachings of the present disclosure may include, for example, presenting at a display of a computer device a first graphical user interface depicting a game space of a gaming application, receiving a detected stimulation from a mobile communication device associated with a second graphical user interface depicting a virtual peripheral controller for capturing control information for controlling the gaming application, detecting a request to swap between the computer device and mobile communication device presentation of the first graphical user interface depicting the game space and the second graphical user interface depicting the virtual peripheral controller, and presenting at the display of the computer device an adaptation of the second graphical user interface depicting the virtual peripheral controller responsive to the detected request to swap. Additional embodiments are disclosed.

30 Claims, 10 Drawing Sheets

(56) References Cited

OTHER PUBLICATIONS

Hindustan Times, "Nokia GEM phone has morphing touchscreen display", www.hindustantimes.com/technology/PersonalTech/Nokia-GEM-phone-has-morphing-touchscreen-display/Article1-767754.aspx; Nov. 11, 2011.

Macrumors, "Joypad Turns Your iPhone Into a NES Controller", www.macrumors.com/2011/06/16/joypad-turns-your-iphone-into-a-nes-controller/;Jun. 16, 2011.

* cited by examiner

500

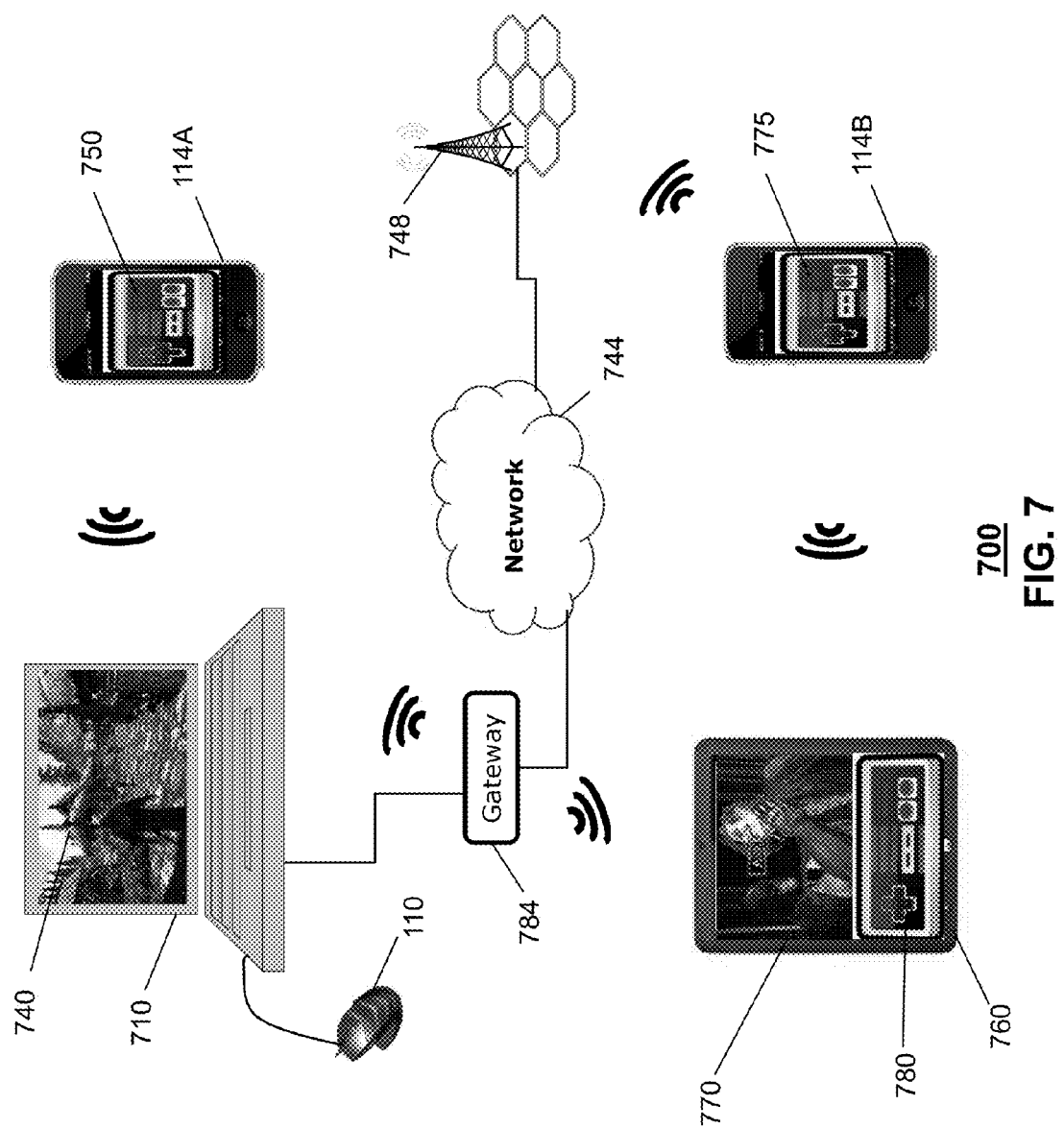

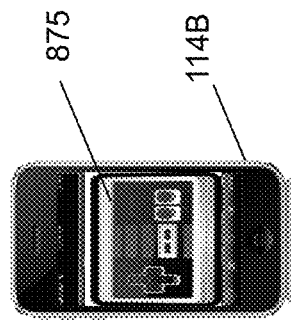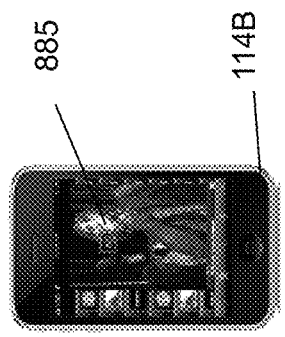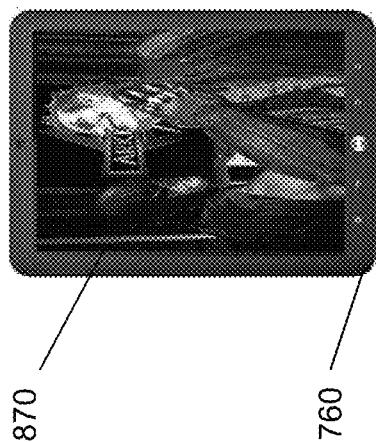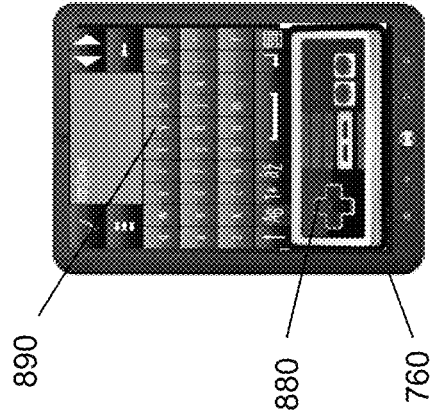
FIG. 8A
FIG. 8B

900

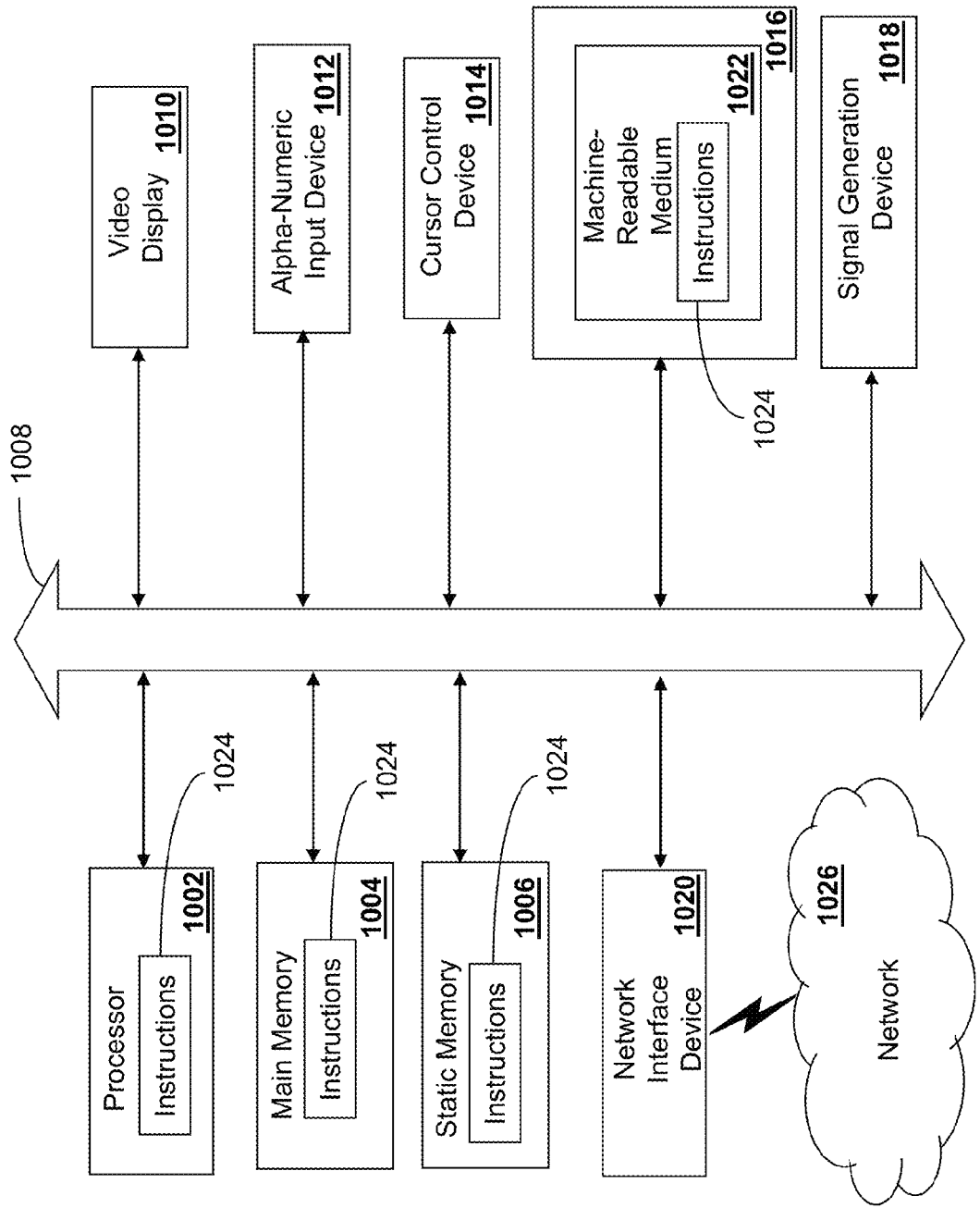

METHOD AND APPARATUS FOR ADAPTING APPLICATIONS OVER MULTIPLE DEVICES

FIELD OF THE DISCLOSURE

The present disclosure relates generally to an apparatus for transitioning in-process applications between mobile devices.

BACKGROUND

Electronic software, particularly gaming software, is commonly played on personal computers and gaming systems. Players typically interact with gaming software using gaming accessories such as a keyboard, a general purpose gaming pad, a mouse, a gaming console controller, a headset with a built-in microphone to communicate with other players, a joystick, a computer or high definition display, or other common gaming accessories. Gamers commonly use such accessories to enjoy the gaming experience from their homes or while in transit (e.g., on a train) while participating in the gaming experienced generated and displayed on their gaming systems.

BRIEF DESCRIPTION OF THE DRAWINGS

FIG. 7 depicts an illustrative embodiment of a distributed computer system for accessing a software application;

FIGS. 8A and 8B depict an illustrative embodiment of a distributed computer system for accessing a software application;

FIG. 10 depicts an illustrative diagrammatic representation of a machine in the form of a computer system within which a set of instructions, when executed, may cause the machine to perform any one or more of the methodologies disclosed herein.

DETAILED DESCRIPTION

Figure 1:
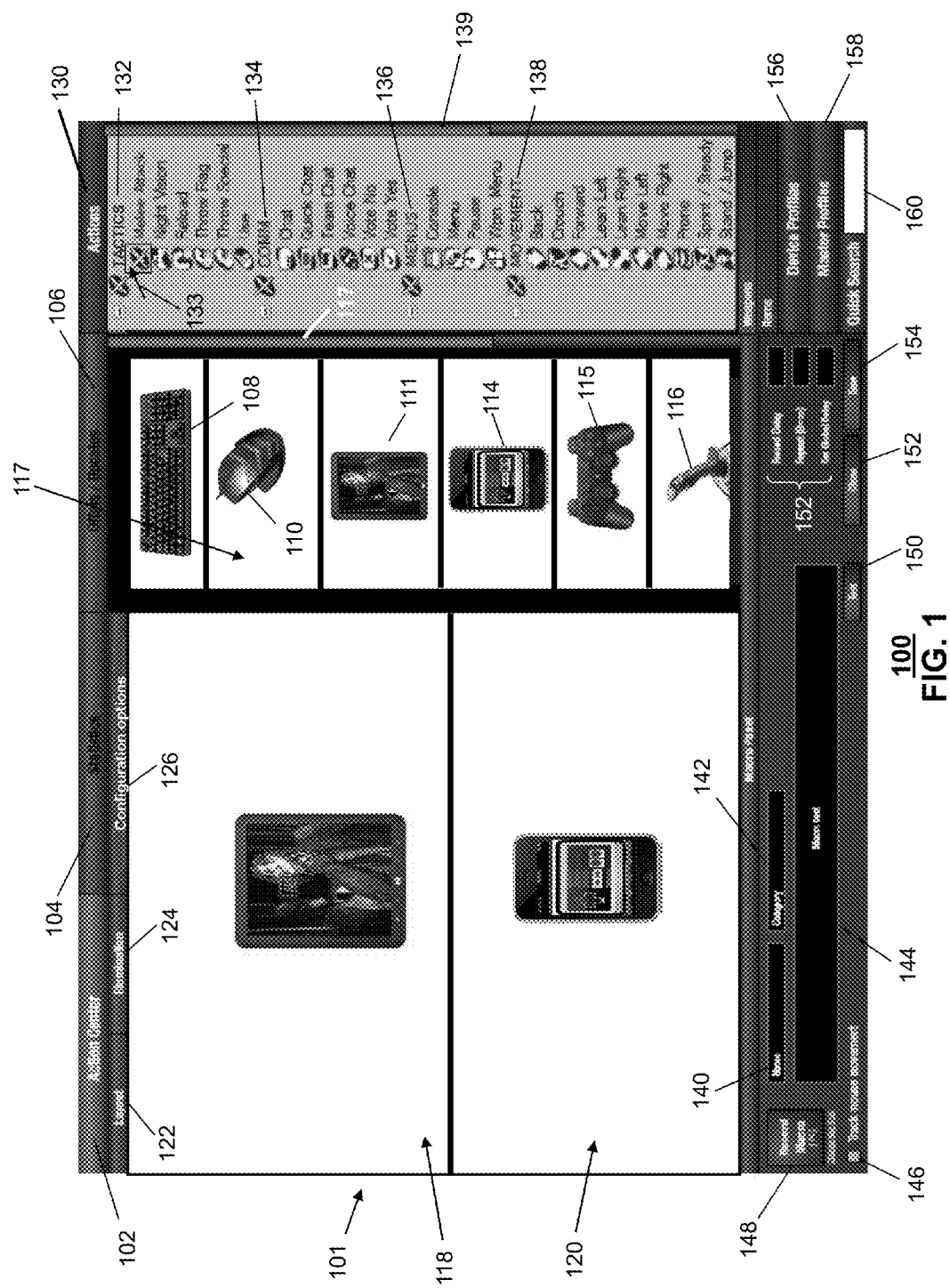
FIGS. 1, 2, and 3 depict illustrative embodiments of a Graphical User Interface (GUI) generated by an Accessory Management Software (AMS) application according to the present disclosure.

One embodiment of the present disclosure includes computer device, including a memory coupled to a processor. The memory includes computer instructions, which when executed by the processor, cause the processor to process a gaming application at the computer device and to present a first graphical user interface depicting a game space of the gaming application at a display of the computer device. The processor can receive at the computer device a detected stimulation from a mobile communication device. The detected stimulation can be associated with a second graphical user interface depicting a virtual peripheral controller for capturing user navigation and control inputs to the gaming application from the mobile communication device. The processor can, in turn, retrieve at the computer device at least one action of a plurality of associable actions. The at least one action can correspond to the received stimulation. The processor can further transmit the retrieved at least one action to an operating system of the computer device for use in the gaming application. The processor can detect a request to swap the first graphical user interface depicting the game space and the second graphical user interface depicting the virtual peripheral controller between the computer device and the mobile communication device. In response to the detected request to swap, the processor can present at the display of the computing device the virtual peripheral controller adapted for presentation at the computing device.

One embodiment of the present disclosure includes a computer-readable storage medium comprising computer instructions, which when executed by a processor causes the processor to present at a mobile communication device a first graphical user interface corresponding to a virtual peripheral controller for capturing user navigation and control inputs. The processor can also capture a detected stimulation of the virtual peripheral controller at the mobile communication device. The processor can further transmit the detected stimulation from the mobile communication device to cause an update in a second graphical user interface depicting a game space presented at a computing device. The gaming application can generate the game space. The second graphical user interface can be updated responsive to the gaming application processing the detected stimulation. The processor can further receive an adaptation of the second graphical user interface from the gaming application responsive to a request to swap the presentation of the game space from the computing device to the mobile communication device.

One embodiment of the present disclosure includes a method including presenting at a display of a computer device a first graphical user interface depicting a game space of a gaming application operating at the computer device. The method can include receiving at the computer device a detected stimulation from a mobile communication device. The detected stimulation can be associated with a second graphical user interface depicting a virtual peripheral controller presented at the mobile communication device for capturing user navigation and control inputs to the gaming application from the mobile communication device. The method can further include detecting a request to swap between the computer device and the mobile communication device presentations of the first graphical user interface depicting the game space and the second graphical user interface depicting the virtual peripheral controller. The method can also include presenting at the display of the computer device an adaptation of the second graphical user interface depicting virtual peripheral controller responsive to the detected request to swap.

Figure 2:
Figure 3:
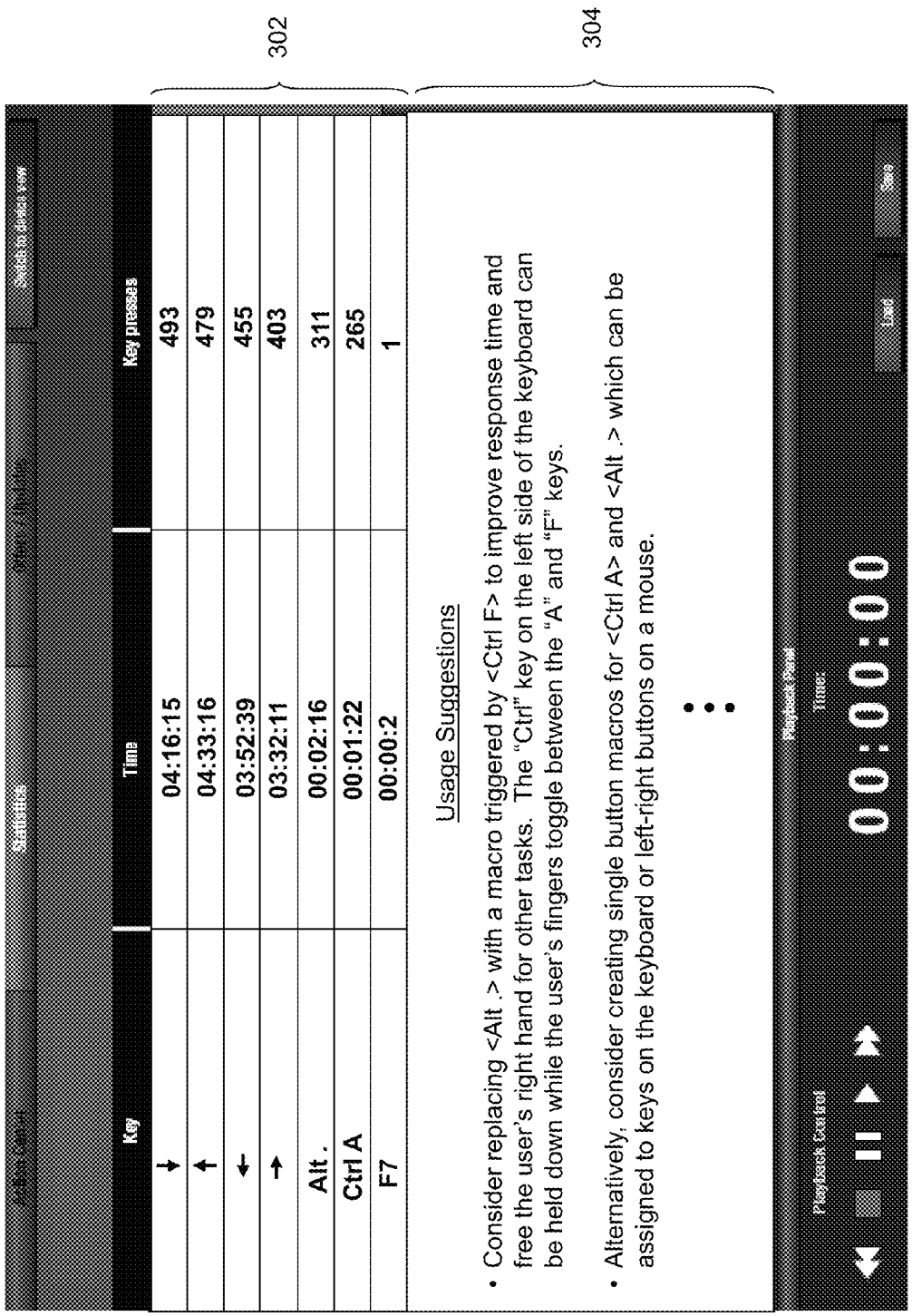

FIGS. 1-3 depict illustrative embodiments of a Graphical User Interface (GUI) generated by an Accessory Management Software (AMS) application according to the present disclosure. The AMS application can operate in a computing device such as a desktop computer, a laptop computer, a server, a mainframe computer, a gaming server, a gaming console, or other suitable computing devices. A gaming console can represent a gaming box such as a PlayStation 3™, a Wii™, or an Xbox360™. Other present and next generation gaming consoles are contemplated. The AMS application can also operate in other computing devices with less computing resources such as a cellular phone, a personal digital assistant, or a media player (such as an iPod™, an iPAD™, etc.). From these illustrations it would be apparent to an artisan with ordinary skill in the art that the AMS application can operate in any device with computing resources.

The AMS application can be applied to a method and an apparatus for a distributed computing system. In one embodiment, the AMS application can operate at any device or at any combination of devices across a distributed system to allow user access to a software application running at any device in the distributed system. The AMS application can operate at a computer device, a mobile device, and/or a server device to facilitate distributed access to a software application. In one embodiment, the AMS application can support a host-peripheral architecture, where a host computing device processes software, such as a gaming application, while a peripheral computing device acts as a virtual gaming controller device. The peripheral computing device can capture user inputs to a virtual gaming controller device and transmit to the host device stimulations associated with the captured inputs. In one embodiment, the AMS application at the host computing device can process received peripheral computing device stimulation inputs and make processed information available to a software application, such as a gaming application, that is running on the operating system of the host computing device. The host computing device can thereby use the peripheral device as a virtual peripheral device.

In one embodiment, the host computing device can present a first graphical user interface on a display of the host computing device. For example, the first graphical user interface can be a graphics image of a game space including features, characters, informational displays, and/or controls associated with the gaming application. In one embodiment, the host device can be a first computer device, such as a desktop computer, laptop computer, smart pad device, smart pod device, or a mobile phone device.

In one embodiment, the peripheral computing device can present a virtual peripheral controller. The virtual peripheral controller can be another graphical user interface that can include graphical renditions of physical features, informational displays, and user inputs that allow a user to interact with virtual peripheral controller to provide navigational and control input to the software application. For example, the peripheral computing device can display, on a touch screen, a graphical rendition of a virtual gaming console controller. The peripheral computing device can emulate the look, feel, and functionality of a traditional, physical controller or can create a virtual controller that presents new functional or aesthetic features or can combine both concepts into the virtual controller. The peripheral computing device can monitor user interactions with the touch screen display, with other physical inputs to the peripheral computing device, and/or combinations of virtual and physical inputs. As the user interacts with and selects these inputs, the peripheral computing device can capture the inputs and transmit the captured inputs, or stimulations (stimuli) to the host computing device for processing as described above. In one embodiment, the peripheral device can be a second computer device, such as a desktop computer, laptop computer, smart pad device, smart pod device, or a mobile phone device.

In one embodiment, the host device's AMS application can detect a request to swap the host and peripheral functions between the devices. In other words, if the host function was initially on a first computing device and the peripheral function was on a second computing device, then a swap would involve moving the host function to the second computing device, while moving the peripheral function to the first computing device. In one embodiment, if a swap request is detected, the original host computing device can transmit a stream of the first graphical user interface to the peripheral computing device. The peripheral computing device can present the streamed graphics on a display associated with the peripheral computing device. For example, if the peripheral computing device is a mobile phone device, the streamed graphics representing the graphical user interface for the gaming application can be displayed on a touch screen built into the phone. In this embodiment, the gaming application continues to execute on the host computing device but is displayed on the peripheral computing device.

In one embodiment, the host computing device can transmit to the peripheral computing device data and/or operating parameters corresponding to a present state of the gaming application at the point the swap request was received. For example, the host computing device can respond to the swap request by storing the present state of the game as, for example, would occur if a player executed a "save state" command during game play. The host computer device can transmit to the peripheral device all the necessary data for initializing the game to the saved state. In one embodiment, the peripheral computing device can then execute the software application locally (on the peripheral computing device) using the initialization information.

In one embodiment, the host computing device can present the virtual peripheral controller at a display of the host computing device. The virtual peripheral controller can be identical to that formerly presented at the peripheral computing device or can be adapted to the host computing device. In one embodiment, the peripheral computing device can transmit a user profile and/or virtual peripheral controller profile to the host computing device so that user settings or other customizations of the virtual peripheral controller can be transferred to the host computing device during the swap.

Figure 4:
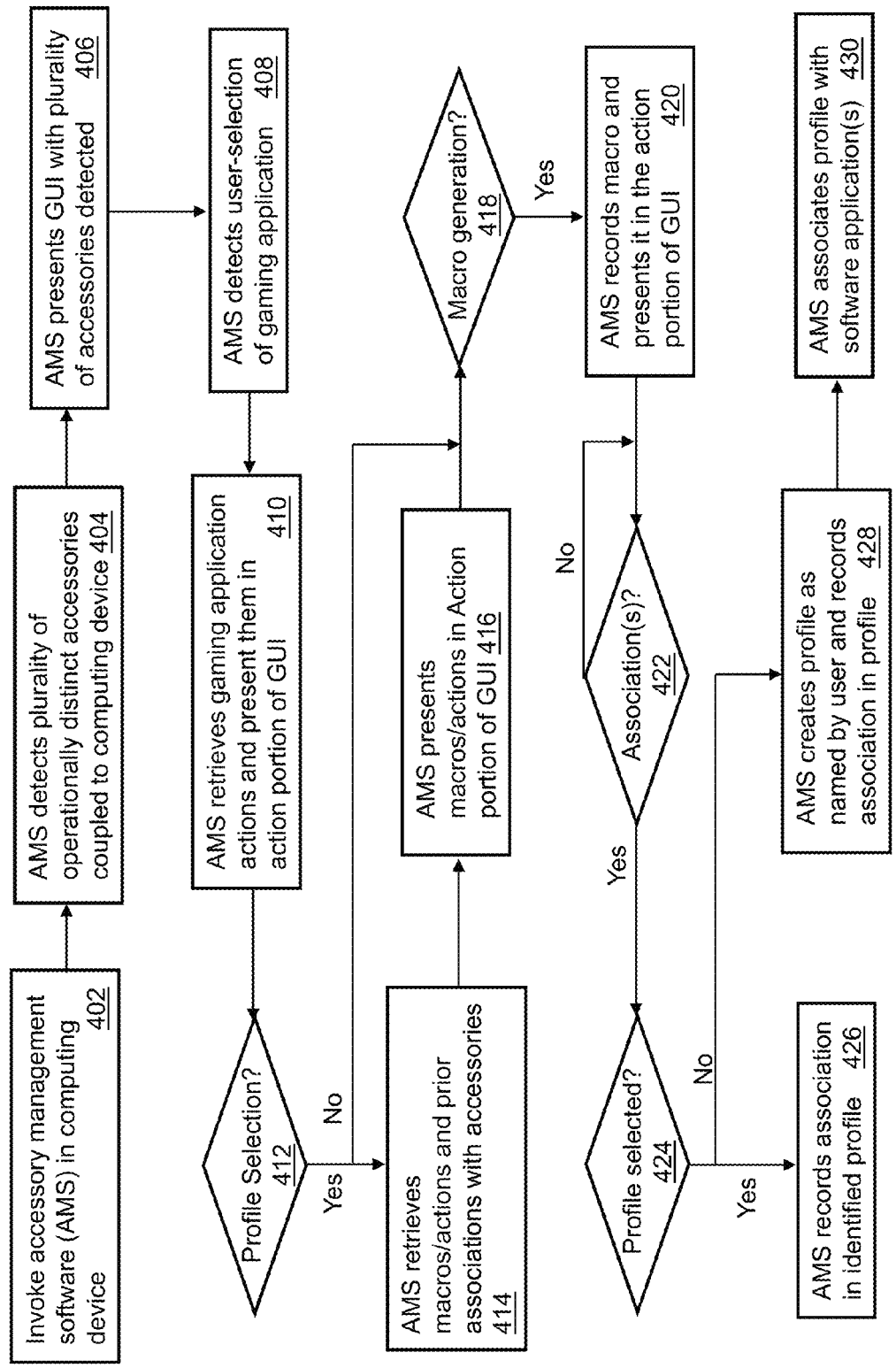
FIGS. 4-6 depict illustrative methods describing the operation of the AMS application.
Figure 5:
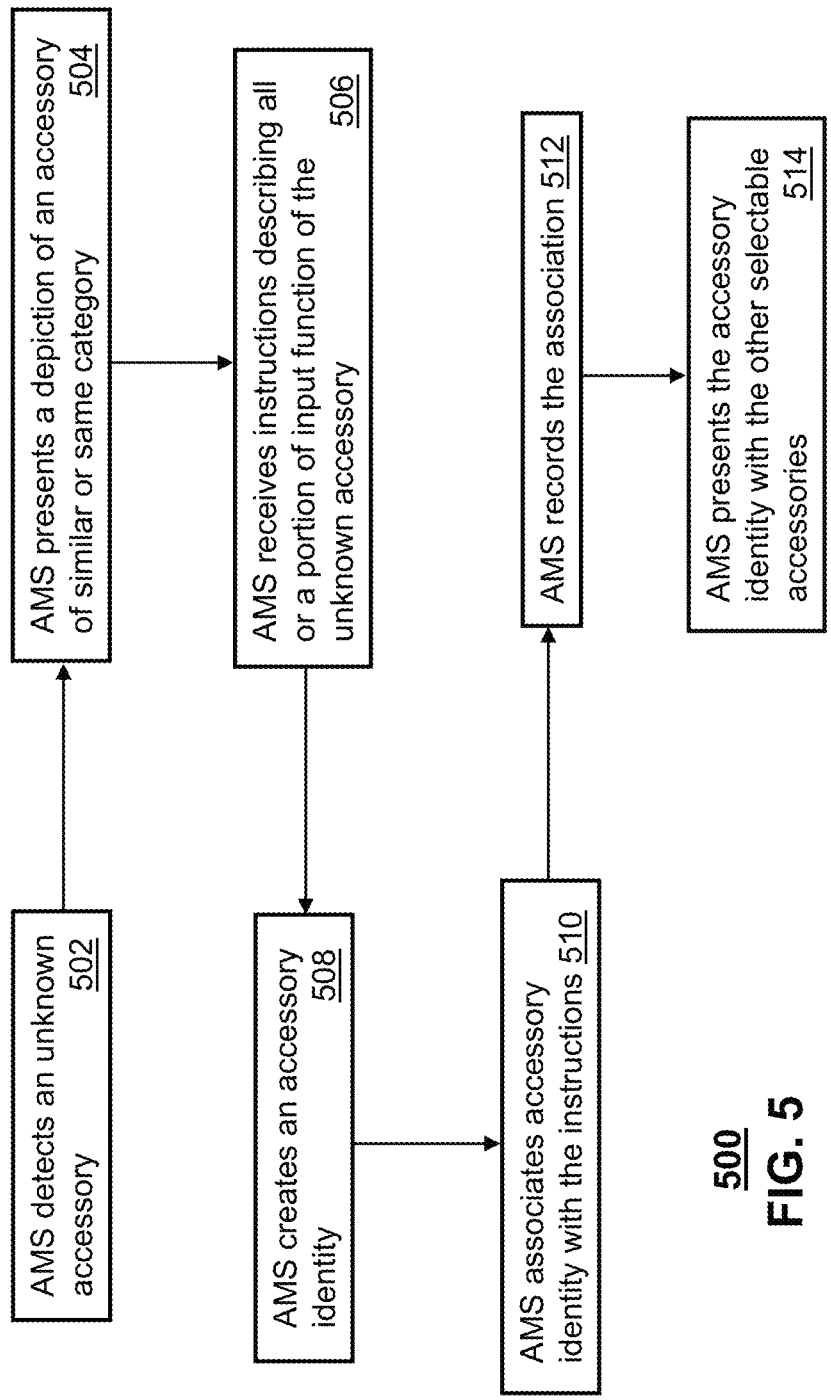
Figure 6:
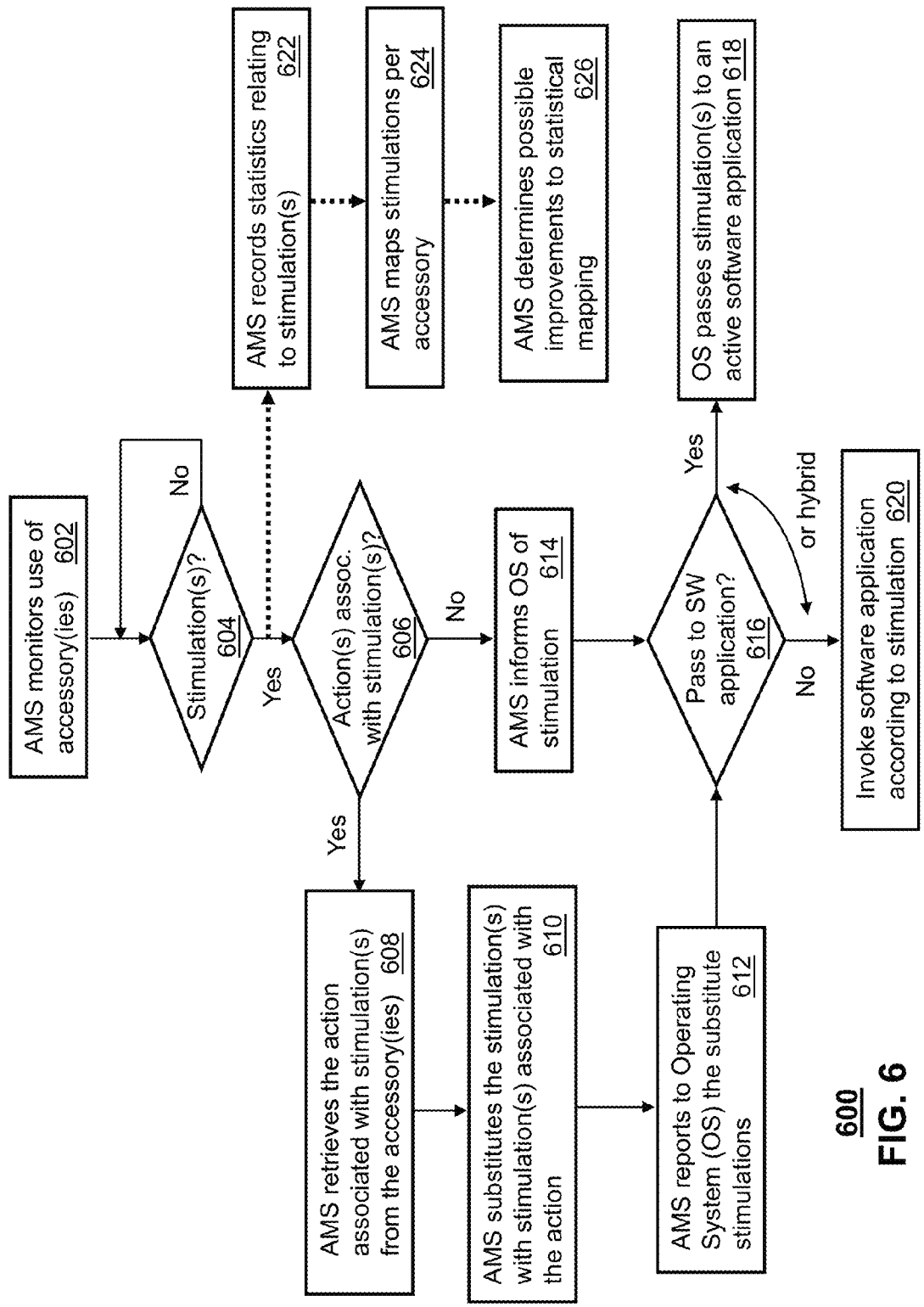

FIGS. 4-6 depict illustrative methods 400-600 describing the operation of the AMS application as shown in FIGS. 1-3. Method 400 can begin with step 402 in which the AMS application is invoked in a computing device. The invocation step can result from a user selection of the AMS application from a menu or iconic symbol presented on a desktop of the computing device by an operating system (OS) managing operations thereof. In step 404, the AMS application can detect by way of drivers in the OS a plurality of operationally distinct accessories communicatively coupled to the computing device. The accessories can be coupled to the computing device by a tethered interface (e.g., USB cable), a wireless interface (e.g., Bluetooth or Wireless Fidelity—Wi-Fi), a mobile cellular network, or combinations thereof In the present context, an accessory can represent any type of device which can be communicatively coupled to the computing device and which can control aspects of the OS and/or a software application operating in the computing device. An accessory can represent for example a keyboard 108, a gaming pad, a mouse 110, a gaming console controller 115, a joystick 116, a microphone, or a headset with a microphone—just to mention a few. An accessory can also represent for example, gaming goggles or apparel with sensors. An accessory can also represent, a virtual peripheral controller presented by a mobile communication device 114.

The keyboard 108 and gaming pad represent accessories of a similar category since their operational parameters are alike. A mouse 110, on the other hand, represents an accessory having disparate operational parameters from the keyboard or gaming pad. For instance, the operational parameters of a keyboard 108 generally consist of alphanumeric keys, control keys (e.g., Shift, Alt, Ctrl), and function keys while the operational parameters of a mouse consist of navigation data generated by a tracking device such as a laser sensor, buttons to invoke GUI selections, and settings thereof (e.g., counts or dots per inch, acceleration, scroll speed, jitter control, line straightening control, and so on). Such distinctions can be used to identify disparate categories of accessories. The joysticks 116, game controllers 115 or any other input devices represent additional categories of accessories supported by the AMS.

In one embodiment, the AMS application can detect a virtual peripheral controller operating from a mobile communication device 114. For example, a mobile communication device 114 can be communicatively coupled to a host computing device that is executing the AMS application. For example, the coupling can be through a wireless link, such as Wi-Fi, Bluetooth, or a cellular link. In this embodiment, a graphical user interface presented by the mobile communication device 114 can depict user input elements corresponding to a peripheral controller, such as a virtual gaming console controller, a virtual gaming pad, or a virtual joystick. For example, the graphical user interface can depict joystick and button elements consistent with a gaming console controller. As the user interacts with the virtual peripheral controller on the mobile communication device 114, user inputs can be captured and converted into stimuli by the mobile communication device 114. The stimuli can be output from the mobile communication device 114 to the AMS application on the host computing device over the communications link. The AMS application can process the received stimuli, as it does stimuli for other accessory devices, as described below. For example, the AMS application executed by the host computing device can record macro actions corresponding to stimuli from a virtual peripheral controller at a mobile communication device 114. The AMS application can pass stimuli, or stimuli substitutes, captured from the virtual peripheral controller at a mobile communication device 114 to an operating system of the host computing device for use by a software application running at the host computing device.

In one embodiment, the AMS client application software can be downloaded to the mobile communication device 114 presenting the virtual peripheral controller. For example, an AMS application at a host computing device can detect a mobile communication device 114 with a virtual peripheral controller that is connected to the host computing device. As the user interacts with the virtual peripheral controller at the mobile communication device 114, user inputs can be captured and converted into stimuli by the mobile communication device. The stimuli can be output from the mobile communication device 114 to the host computing device and its AMS application over the communications link. The host AMS application can process the received stimuli, as it does stimuli for other accessory devices. The host AMS application can then compare a received stimulation from the mobile communication device 114 against substitute stimuli and/or recorded macros. The host AMS can similarly store and later compare the received stimulations against alternative actions that a user has configured in the user profile. The host AMS application can thereby send to the operating system of the host computing device default actions associated with the received stimulation, alternative (or substitute) stimulations associated with the received stimulation, or substitute macros of several gaming actions that are associated, as a group, with the received stimulation. The gaming action(s) that the host AMS application sends to the operating system can then be used by the software gaming application running at host computing device.

In step 406, the AMS application presents a GUI 101 such as depicted in FIG. 1 with operationally distinct accessories such as a tablet 111 and mobile communication device 114. The GUI 101 presents the accessories 108-116 in a scrollable section 117. One or more accessories can be selected by a user with a common mouse pointer. In this illustration, the tablet 111 and mobile communication device 114 were selected with a mouse pointer for customization. Upon selecting the tablet 111 and mobile communication device 114 in section 117, the AMS application can present the tablet 111 and mobile communication device 114 in split windows 118, 120, respectively, to help the user during the customization process.

In step 408, the AMS application can be programmed to detect a user-selection of a particular software application such as a game. This step can be the result of the user entering in a Quick Search field 160 the name of a gaming application (e.g., World of Warcraft™). Upon identifying a gaming application, the AMS application can retrieve in step 410 from a remote or local database gaming application actions which can be presented in a scrollable section 139 of the GUI represented as "Actions" 130. The actions can be tactical actions 132, communication actions 134, menu actions 136, and movement actions 138, or any other types of actions, which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories by way of a simple drag and drop action. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the tablet 111 or a virtual peripheral controller of the mobile communication device 114.

In one embodiment, a user can drag a Melee Attack symbol to a button of the virtual peripheral controller thereby causing an association between the selection of the button and the gaming action of a Melee Attack. When the button of the virtual peripheral controller presented by the mobile communication device 114 is selected during normal operation, the AMS application can detect the selection as a "trigger" to generate the key sequence "Ctrl A" which is understood by the gaming application as request for a Melee Attack. The gaming application receives from the AMS application by way of an operating system the "Ctrl A" sequence as if it had been generated by a Qwerty keyboard.

With this in mind, attention is directed to step 412 where the AMS application can respond to a user selection of a profile. A profile can be a device profile or master profile invoked by selecting GUI button 156 or 158, each of which can identify the association of actions with input functions of one or more accessories. If a profile selection is detected in step 412, the AMS application can retrieve macro(s) and/or prior associations of actions with the accessories as defined by the profile in step 414. The actions and/or macros defined in the profile can also be presented in step 416 by the AMS application in the actions column 130 of the GUI 101 to modify or create new associations.

In step 418, the AMS application can also respond to a user selection to create a macro. A macro in the present context can represent a subset of actions that can be presented in the Actions column 130. Any command which can be recorded by the AMS application can be used to define a macro. A command can represent a sequence of input functions of an accessory, identification of a software application to be initiated by an operating system (OS), or any other recordable stimulus to initiate, control or manipulate software applications. For instance, a macro can represent a user entering the identity of a software application (e.g., instant messaging tool, team chat tool such as Skype™) to be initiated by an OS. A macro can also represent recordable speech delivered by a microphone singly or in combination with a headset for detection by another software application through speech recognition or for delivery of the recorded speech to other parties. In yet another embodiment a macro can represent recordable navigation of an accessory such as a mouse or joystick, recordable selections of buttons on a keyboard, a mouse, a mouse pad, a pair of gaming goggles, or a gaming accessory, and so on. In another embodiment, macros can be combinations of the above illustrations. Macros can be created from the GUI 101 by selecting a "Record Macro" button 148. The macro can be given a name and category in user-defined fields 140 and 142. Macros can similarly be associated with input functions of a virtual peripheral controller presented by the mobile communication device 114.

Upon selecting the Record Macro button 148, a macro can be generated by selection of input functions on an accessory (e.g., Ctrl A, speech, etc.) and/or by manual entry in field 144 (e.g., typing the name and location of a software application to be initiated by an OS). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to customize such timing.

Once the macro has been fully defined, selection of button 154 records the macro in step 420. The recording step can be combined with a step for adding the macro to the associable items Actions column 130, thereby providing the user the means to associate the macro with input functions of the accessories of windows 118 and 120.

In step 422, the AMS application can respond to drag and drop associations between actions and input functions of the tablet 111 or mobile communication device 114. If an association is detected, the AMS application can proceed to step 424 where it can determine if a profile has been identified in step 412 to record the association(s) detected. If a profile has been identified, the associations are recorded in said profile in step 426. If a profile was not been identified in step 412, the AMS application can create a profile in step 428 for recording the detected associations. In the same step, the user can name the newly created profile as desired. The newly created profile can also be associated with one or more gaming software applications in step 430 for future reference.

The GUI 101 presented by the AMS application can have other functions. For example, the GUI 101 can provide options for layout of the accessory selected (button 122), how the keyboard is illuminated when associations between input functions and actions are made (button 134), and configuration options for the accessory (button 126). Configuration options can include operational settings of a mouse 110 such as Dots-per-Inch or Counts-per-Inch, and so on. The AMS application can adapt the GUI 101 to present more than one functional perspective. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics in relation to the usage of accessories as depicted in FIGS. 2-3. Although FIG. 2 depicts a keyboard, the GUI of FIG. 2 can also be adapted to present color-coded statistics for the tablet 111 and/or mobile communication device 114. Selecting button 106 can cause the AMS application to adapt the GUI 101 to present promotional offers and software updates.

It should be noted that the steps of method 400 in whole or in part can be repeated until a desirable pattern of associations of actions to input functions of the selected accessories has been accomplished. It would be apparent to an artisan with ordinary skill in the art that there can be numerous other approaches to accomplish similar results. These undisclosed approaches are contemplated by the present disclosure.

FIG. 5 depicts a method 500 in which the AMS application can be programmed to recognize unknown accessories so that method 400 can be applied to them as well. Method 500 can begin with step 502 in which the AMS application detects an unknown accessory such as a new keyboard, gaming goggles, tablet, mobile communication device, or gaming accessory from an unknown vendor by way of a communicative coupling the accessory with a computing device from which the AMS application operates. The AMS application can detect an unknown virtual accessory emulated on a mobile communication device 114 or an unknown remote accessory device that is connected to a mobile communication device. The AMS application can receive an identity from the accessory or the operating system. Upon detecting an unknown accessory, the AMS application in step 504 can present a depiction of an accessory of similar or same category in response to a user providing direction as to the type of accessory (by selecting for example a drop-down menu). Alternatively, or in combination with the user instructions, the AMS application can determine from the information received from the unknown accessory an accessory type.

In step 506 the AMS application can receive instructions describing all or a portion of the input functions of the unknown accessory. These instructions can come from a user who defines each input function individually or responds to inquiries provided by the AMS application. The AMS application can for example make an assumption as to a keyboard layout and highlight each key with a proposed function which the user can verify or modify. Once the AMS application has been provided instructions in step 506, the AMS application can create an accessory identity in step 508 which can be defined by the user. In steps 510 and 512, the AMS application can associate and record the accessory instructions with the identity for future recognition of the accessory. In step 514, the AMS application can present a depiction of the new accessory with its identity along with the other selectable accessories in section 117.

Method 500 can provide a means for universal detection and identification of any accessory which can be used to control or manage software applications operating in a computing device.

FIG. 6 depicts a method 600 for illustrating the AMS application responding to input function stimuli (triggers) of accessories. Method 600 can begin with step 602 in which the AMS application monitors the use of accessories. This step can represent monitoring the stimulation of input functions of one or more accessories communicatively coupled to a computing device from which the AMS application operates. In one embodiment, a physical accessory device can be coupled to a computing device executing the AMS application. In one embodiment, a physical accessory device can by coupled to a mobile communication device that can be further coupled to the computing device executing the AMS application. In one embodiment, a virtual accessory can be emulated by a mobile communication device 114 that can be coupled to the computing device executing the AMS application. The computing device can be a remote server or a local device near the accessories. The input functions can correspond to button depressions on a keyboard, gaming pad, or navigation device such as a mouse. The input functions can also represent navigation instructions such as mouse or joystick movements. The input functions can further represent speech supplied by a microphone singly or in combination with a headset. The input functions can also represent button depression at gaming goggles or a gaming accessory. Other existing or future input functions of an accessory detectable by the AMS application are contemplated by the present disclosure. The AMS application can monitor input functions by for example processing human interface device (HID) reports supplied by the accessories to the computing device.

Once one or more stimulations have been detected in step 604, the AMS application can proceed to step 606 to determine if action(s) have been associated with the detected stimulation(s). If for example the stimulations detected correspond to keyboard and mouse button depressions, the AMS application can determine if actions have been associated and recorded for such stimulations. If these stimulations "trigger" one or more actions, the AMS application can proceed to step 608 where it retrieves the stimulation definition of these actions for each accessory reporting a stimulation event. In step 610, the AMS application can substitute the detected stimulations with the stimulations defined by the action.

To illustrate this substitution, suppose for example that the detected stimulation was "Ctrl A" simultaneously depressed on a keyboard. Suppose further that an action associated with this stimulus consists of a macro that combines mouse clicks with a navigation of the mouse (e.g., moving the mouse quickly in a forward motion for a given distance), and a request to invoke an instant messaging (IM) session with a particular individual using Skype™ or some other common IM tool. In step 610, the AMS application would substitute "Ctrl A" for stimulations consisting of the mouse clicks, navigation and a request for an IM application. The substitute stimulations would then be reported in step 612 to an operating system (OS).

In step 616, the OS can determine whether to pass the substitute stimulations to an active software application in operation (e.g., a gaming application) and/or to invoke another software application. The active software application can be operating from the same computer system from which the OS and the AMS application operate or can be operating at a remote system such as an on-line server or family of servers (e.g., World of Warcraft™) awaiting stimulation data from the computer system. In this illustration, the macro comprises both stimulation feedback for the active software application and a request to initiate an IM session. Accordingly, the OS conveys in step 618 the mouse stimulation signals to the active software application (e.g., gaming application), and in a near simultaneous fashion invokes the IM session in step 620 with a specific individual (or organization).

Referring back to step 606, the illustrations above cover a scenario in which the AMS application has detected an association of actions to accessory stimuli. If however the AMS application does not detect such an association, then the detected stimulus (or stimuli) supplied by one or more accessories is transmitted to the OS in step 614. For example, it may be that a stimulation based on the depressions of "Ctrl A" has no particular association to an action having substitute stimuli. In this case, the AMS application passes this stimulation to the OS with no substitute stimulations. In step 616 the OS can determine if this stimulation invokes a new software application in step 620 or is conveyed to the previously initiated software application. All of the above-described steps can be performed, for example, on physical accessories coupled to the computer device executing the AMS application, on physical accessories coupled to mobile communication devices that are coupled to the computer device executing the AMS application, and/or virtual peripheral controllers at mobile communication devices 114 that are coupled to the computer device executing the AMS application.

Contemporaneous to the embodiments described above, the AMS application can also record in step 622 statistics relating to the detected accessory stimulations. A portion of the AMS application can operate as a background process which performs statistical analysis on the stimulations detected. By selecting button 104 in FIG. 1, the AMS application can provide an updated GUI which illustrates the usage of input functions of one or more accessories for which stimulations were detected in step 604. A keyboard accessory is shown in FIG. 2. In this illustration, certain keys (references 205, 206 208, 210) on the keyboard are color-coded to illustrate the frequency of usage of these keys.

A color scale 203 defines the frequency of usage of the input functions of the keyboard. The first end of the scale (navy blue) represents a single detected depression, while an opposite end of the scale (bright red) represents 500 detected depressions. Based on this scale, the AMS application maps by color in step 624 stimulations of the keyboard. For example, the key grouping 208 depict a color coding with the highest detectable usage, while the F7 key (reference 210) indicates the fewest depressions. Keys having zero depressions are not color coded to readily identify the color mapping of keys which were used at least once.

The AMS application provides additional functions in a playback panel of the GUI which can help a user understand how the color coded keys were used during an active software application such as a video game. In this section of the GUI, the AMS application can present the user with a playback control function 202 which the user can select to replay, pause, forward or rewind the usage of these keys. When usage playback is selected, the user can for instance see the color coded keys highlighted in real-time with a temporary white border to visualize how the keys were selected. A time clock 204 provides the user the elapsed time of the playback sequence. Button 212 allows the user to retrieve statistics from other sessions, while button 214 provides the user a means to save statistics from a given session.

The GUI of FIG. 2 could have been shown as a split screen with all accessories which generated one or more detected stimulations (e.g., keyboard, mouse, microphone, tablet GUI, and/or mobile communication device GUI), each providing statistical symbolic results as described above for the keyboard. Although not shown, split screen embodiments are contemplated by the present disclosure for the GUI of FIGS. 2.

In addition to a symbolic representation as shown in FIGS. 2, the AMS application can provide the user a means to visualize raw statistics in a table format such as shown in FIG. 3 by selecting button 212. The table format shows raw data in section 302 and possible suggestions in section 304 for improving user performance which can be generated by the AMS application in step 626. Section 302 can be presented in a table format with a column identifying the key being analyzed, its usage, and number of key presses. The user can ascertain from this table the most and least frequently used keys as well as other identifiable patterns.

The AMS application can utilize an understanding of the layout of the accessory (in this case, the keyboard) to determine from the statistics ways that the user can improve response time or ergonomic use. For example, the AMS application can determine from a layout analysis that the key combination <Alt.> can be reassigned to a macro based on the trigger <Ctrl F> which could provide the user a faster response time and free up the user's right hand for other tasks. The AMS application can also provide alternative suggestions. For example, the AMS application can also suggest creating single button macros for each of the key combinations <Alt.> and <Ctrl A> which can be assigned to keys on the keyboard or left and right buttons of a mouse. The latter suggestion of assigning macros to the mouse can help the user free up his/her left hand.

The AMS application can utilize present and next generation algorithms to determine how to improve response times and ergonomic usage of accessory devices. The AMS application can for example have at its disposal an understanding of the layout of each accessory, the type of software being controlled by the accessory (e.g., World of Warcraft), type of operations commonly used to control the software (e.g., known actions as shown in the actions column 130 of FIG. 1), an understanding of the associations made by other users (e.g., gamers) to improve their performance when controlling the software, and so on. The AMS application can also be operable to communicate with the active software application by way of an Application Programming Interface (API) to receive additional usage statistics from the software which it can in turn use to improve the user's performance. The AMS application can also utilize common statistical and behavior modeling techniques to predict the behavior of the user and responses from the software application to identify possible ways to improve the user's performance.

FIG. 7 depicts an illustrative embodiment of a distributed computer system 700 for accessing a software application. System 700 can include two or more communicatively coupled computing devices. For example, the system 700 can include one or more computer devices 710, mobile communication devices 740, 114A and 114B, and/or mobile computing devices 760. The system 700 can include one or more virtual accessory devices 114A and 114B, such as virtual peripheral controllers 750 and 775 that are emulated on mobile communication device 114A and 114B. The several computing devices of the system 700 can be communicatively coupled by connection to a network 744, such as a local area network (LAN) or a wide-area network (WAN). The network 744 can provide access to the Internet. In one embodiment, the two or more computing devices can be directly coupled without a network. For example, two or more computing devices can be communicatively coupled by a wired connection or by a wireless connection, such as a Wi-Fi or Bluetooth connection. For example, a computer device 710 can be communicatively coupled to a mobile communication device 114A by a direct wireless connection, such as Bluetooth link between the two devices. For example, the computer device 710 can be communicatively coupled to the mobile communication device 114A by an indirect wireless connection, such as a cellular link from the mobile communication device 114A to the network 744, or by way of a cellular network coupled to the network 744 which is coupled to a gateway device 784 that establishes communications with the computer device 710 by a WiFi connection or a wired connection. For example, the computer device 710 can also be communicatively coupled to the mobile communication device 114A by an indirect wireless connection, such as a Wi-Fi link from the mobile communication device 114A to the gateway device 784.

The computer devices 710 can be, for example, laptop computers, desktop computers, or tablet computers. The computer device 710 can process and execute computer instructions from a software application. In one embodiment, the software application is a gaming program, where the computer device 710 can present a graphical user interface 740 depicting a gaming scene on a display of, or connected to, the computer device 710. The user of the computer device 710 can interact with the gaming program, to provide navigational and control directives, using any one or a combination of several input devices. For example, a user at the computer device 710 can interact with the gaming application using a mouse 110 connected directly or indirectly to the computer device 710 or a keyboard. In one embodiment, the computer device 710 can use the AMS application to monitor and capture functional inputs, or user stimulations, from physical and/or virtual accessories coupled to the computer device 710. For example, the AMS application operating from the computer device 710 can capture stimulations from a keyboard or touchpad built into the computer device 710. The AMS application can process these stimulations and retrieve associated actions (comprising substitute stimuli) for use by the software application running at the computer device 710. For example, the AMS application at the computer device 710 can capture and process stimulations from a physical accessory, such as a mouse device 110, that is coupled to the computer device 710.

In one embodiment, the computer device 710 can be a host computing device 710 for the system. For example, the host computing device 710 can execute the gaming application and the AMS application, hereinafter referred to as the host AMS application. In one embodiment, the host AMS application at the host computer device 710 can capture and process stimulations from a virtual peripheral controller emulated on a mobile communication device 114A that is coupled to the host computer device 710. The mobile communication device 114A is referred to in this illustration as a peripheral computing device 114A.

In one embodiment, a software application, such as a gaming program, can be executed on the host computing device 710. For example, a user can be playing the gaming program World of Warcraft™ at the host computing device 710. In one embodiment, the host computing device 710 can present a graphical user interface 740 depicting a gaming space (scene, situation, characters, configurations, etc.) on a display of, or connected to, the computer device 710.

In one embodiment, the AMS application operating from the computer device 710 can detect a virtual peripheral controller 750 in the form of a virtual accessory emulated at a mobile communication device 114A. For example, the mobile communication device 114A can be communicatively coupled to a computing device executing the AMS application through a wireless link, such as WiFi, Bluetooth, or a cellular link. The mobile communication device 114A can be a client device executing a client version of the AMS application. The virtual peripheral controller 750 emulated by the mobile communication device 114 can be, for example, a virtual gaming console controller, virtual gaming pad, virtual joystick or other recognizable virtual controllers. In one embodiment, a graphical user interface 750 on the mobile communication device 114A can depict user input elements corresponding to the emulated virtual accessory. For example, the graphical user interface can depict joystick and button elements consistent with a gaming console controller.

In one embodiment, as a user interacts with the virtual peripheral controller 750 on the peripheral computing device 114A, creating user inputs which can be captured and converted into stimuli by a client AMS application operating from the peripheral computing device 114A. The stimuli can be output from the peripheral computing device 114A to the host computing device 710 running the server AMS application over the communications link between the devices 710 and 114A. The server AMS application can process the received stimuli, as it does stimuli for other accessory devices, as described below. For example, the server AMS application can record macro actions corresponding to stimuli from the peripheral computing device 114A. The server AMS application can pass the stimuli, or stimuli substitutes, to an operating system of the AMS server for use by a software application running at the server device. The foregoing embodiments are a subset of possible embodiments contemplated by the present disclosure. Other suitable modifications can be applied to the present disclosure.

In one embodiment, a mobile communication device 114B with a virtual peripheral controller 775 can be coupled to a mobile computing device 760, such as a smart pad device. The mobile communication device 114B and the mobile computing device 760 can be coupled through, for example, a wireless communication, such as Bluetooth, WiFi, or cellular. The mobile computing device 760 can be configured as a host computing device 760 to execute a software application and the host AMS application. For example, the mobile computing device 760 can process a gaming application and present a game space graphical user interface 770 on a built-in display. In one embodiment, the mobile computing device 760 can display its own virtual controller 780 which a user of the mobile computing device 760 can activate through a touch sensitive screen or by way of physical controls built in to the mobile computing device 760.

In one embodiment, a user can navigate and control the gaming application executed on the mobile computing device 760 using the virtual peripheral controller 775 of the mobile communication device 114B. A client AMS application at the mobile communication device 114B can capture user inputs, or stimulations, from the virtual peripheral controller 775 and can send these stimuli to the host computer device 760. The host AMS application at the server computer device 710 can process the received stimuli to determine associated actions and, if necessary, perform macro operations of multiple actions. The processed stimuli are used to navigate and control the software application running at the host computer device 710.

FIGS. 8A and 8B depict an illustrative embodiment of the distributed computer system 800 for accessing a software application. System 800 can include, illustratively, a mobile computer device 760, configured as a host computing device 760, and a mobile communication device 114B, configured as a peripheral computing device. In one embodiment, the system 800 is initially configured such that the host computing device 760 performs the host function (presenting the graphical user interface 870 for the game space) and the peripheral computing device 114B performs the peripheral function (presenting a virtual peripheral controller 875 to navigate and control the gaming application). In one embodiment, the host device's AMS application can detect a request to swap the host and peripheral functions between the devices 760 and 114B. In other words, the host function (presenting the graphical user interface 870 for the game space) and the peripheral function (presenting a virtual peripheral controller 875 to navigate and control the gaming application) can be swapped by moving the host function to the peripheral computing device 114B while moving the peripheral function to the host computing device 760.

In one embodiment, if a swap request is detected, the host computing device 760 can transmit a stream of the game space graphical user interface 870 to the peripheral computing device 114B. The peripheral computing device can present the streamed graphics 885 on a display associated with the peripheral computing device 114B. For example, if the peripheral computing device 114B is a mobile phone device, the streamed graphics representing the graphical user interface for the gaming application can be displayed on a touch screen built into the phone. In this embodiment, the gaming application continues to execute on the host computing device 760 but is displayed on the peripheral computing device 114B.

In one embodiment, the graphical user interface that is streamed to the mobile communication device 114B can be adapted, or transcoded, to correspond to features and/or limitations of the mobile communication device 114B. For example, the server AMS application can adapt, or transcode, the graphical user interface to fit a display size, resolution, or aspect ratio of the mobile communication device 114B. The mobile communication device 114B can display the graphical user interface associated with the resumed software application.

In one embodiment, the host computing device 760 can present a virtual peripheral controller 880 and 890 at its own display. In one embodiment, the virtual peripheral controller 880 can be identical to the virtual peripheral controller 875 formerly presented at the peripheral computing device 114B. In one embodiment, the virtual peripheral controller 880 can be adapted to the features and limitations of the host computing device 760. In one embodiment, the peripheral computing device 114B can transmit a user profile and/or virtual peripheral controller profile to the host computing device 760 so that user settings or other customizations of the virtual peripheral controller can be transferred to the host computing device during the swap. In one embodiment, a different type of virtual peripheral controller 890, such as a keyboard, can by presented at the host computing device 760.

Figure 9:
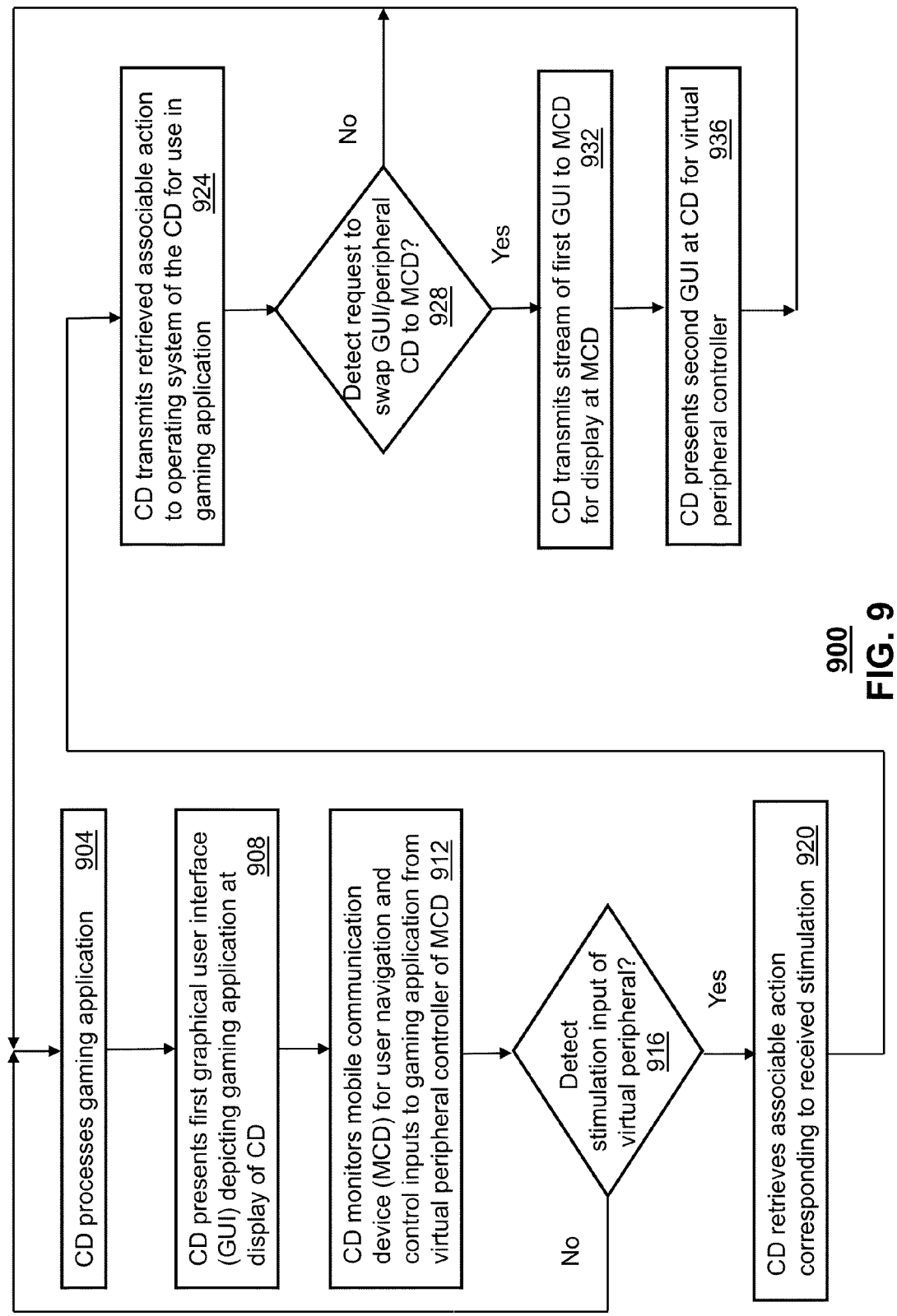
FIG. 9 depicts illustrative embodiments of a method operating in portions of the systems described in FIGS. 1-8.

FIG. 9 depicts an illustrative method 900 that operates in portions of the devices and systems of FIGS. 1-7. Method 900 can begin with step 904 in which a computer device 760 can process a software application. In one embodiment, the computer device 760 can be a personal computer, a laptop computer, and/or a gaming console. In one embodiment, the software application can be gaming software. In one embodiment, a remote server can be used to execute the gaming application. In this case, the remote server can stream to a first computer device a first graphical user interface depicting a game space associated with the gaming application while streaming to a second computer device a second graphical user interface depicting a virtual peripheral controller for controlling the gaming application. The remote server can respond to, or initiate, a request to swap the first and second graphical user interfaces between the first and second computer devices to thereby swap the display and controller functions between the first and second computer devices.

In step 908, the computer device 760 can present a graphical user interface 870 at a display communicatively coupled to the computer device. In one embodiment, the display can be a display screen associated with a laptop computer or a personal computer.

In step 912, the computer device 760 can monitor a mobile communication device 114B for user inputs to a virtual peripheral controller 875 that can be emulated by the mobile communication device 114B. The input functions can correspond, for example, to depressions of buttons, interactions with gaming pads, and/or movements of navigation device such as joysticks.

In step 916, the computer device 760 can detect a stimulation of a virtual peripheral controller 875 at the mobile communication device 114B. In one embodiment, a client AMS application at the mobile communication device 114B can monitor for user inputs for navigating or controlling the resumed software application running at the computer device 760. For example, the client AMS application at the mobile communication device 114B can capture stimulations from a built-in keypad or touch screen as a user interacts with the emulated virtual peripheral controller 875 displayed thereon. The client AMS application at the mobile communication device 114B can transmit the captured stimulations to the computer device 760 by the communication link between the devices.

If a captured stimulation of a remote user input is detected at the computer device 760, then, in step 920, the AMS software at the computer device 760 can retrieve an associable action corresponding to the received stimulation. The AMS application can process the received stimuli as it does stimuli for accessory devices directly coupled to the computer device 760. For example, the AMS application can compare the received stimulation to a user configuration to determine if there are pre-programmed macro actions or alternative actions associated with the particular stimulation. The AMS application can thereby convert the received stimulation, or stimulations, into one or more associable actions that are sent to the operating system of the computer device 760 for use by a software application running at the computer device 760 in step 924.

In step 916, the computer device 760 can detect a request to swap the host and peripheral functions between the devices. For example, a user can be playing a gaming program using the mobile communication device 114B as a virtual peripheral controller 875. The user can select a pause function by pressing, for example, a PAUSE button on the virtual peripheral controller 875. In one embodiment, a selection of PAUSE at the host computing device 760 or the peripheral computing device 114B or either device can be interpreted as a request to swap. In another embodiment, another command can be used to initiate a swap. In one embodiment, a host AMS application at the computer device 760 can detect the swap request from the mobile communication device 114B. In embodiment, a client AMS application at the mobile communication device 114B can detect an input at the virtual peripheral controller 875 and transmit a request to swap. The AMS application can compare this stimulation to a user configuration to determine if the swap input is associated with an action or with a macro of a combination of commands to the operating system of the host computer device 760.

If a swap request is detected in step 928, then the host computing device 760 can transmit a stream of the first graphical user interface 870 to the peripheral computing device 114B in step 932. The peripheral computing device 114B can present the streamed graphics 885 on a display associated with the peripheral computing device 114B. For example, if the peripheral computing device 114B is a mobile phone device, the streamed graphics representing the graphical user interface 885 for the gaming application can be displayed on a touch screen built into the phone. In this embodiment, the gaming application continues to execute on the host computing device 760 but is displayed on the peripheral computing device 114B. In one embodiment, the host computing device 760 can cause the streamed graphical user interface depicting the game space to be synchronized to the state of the graphical interface presented at the host computing device 760 prior to the swap. In one embodiment, a remote server is used to execute the gaming application. And, when the swap request is detected in step 928, the remote server can transmit a stream of the first graphical user interface 870 to the peripheral computer device 114B.

In step 936, the host computing device 760 can present a virtual peripheral controller 880 and 890 at its own display. In one embodiment, the virtual peripheral controller 880 can be identical to the virtual peripheral controller 875 formerly presented at the peripheral computing device 114B. In one embodiment, the virtual peripheral controller 880 can be adapted to the features and limitations of the host computing device 760. In one embodiment, the peripheral computing device 114B can transmit a user profile and/or virtual peripheral controller profile to the host computing device 760 so that user settings or other customizations of the virtual peripheral controller can be transferred to the host computing device during the swap. In one embodiment, a different type of virtual peripheral controller 890, such as a keyboard, can by presented at the host computing device 760.

From the foregoing descriptions, it would be evident to an artisan with ordinary skill in the art that the aforementioned embodiments can be modified, reduced, or enhanced without departing from the scope and spirit of the claims described below. In one embodiment, the peripheral computing device 114B can transmit a user profile and/or virtual peripheral controller profile to the host computing device 760 so that user settings or other customizations of the virtual peripheral controller can be transferred to the host computing device during the swap. In one embodiment, a different type of virtual peripheral controller 890, such as a keyboard, can by presented at the host computing device 760.

In one embodiment, the host computing device 760 can transmit to the peripheral computing device 114B a set of files and/or operating parameters corresponding to the present state of the gaming application at the point the swap request was received. For example, the host computing device 760 can respond to the swap request by storing the present state of the game as, for example, would occur if a player executed a "save state" command during game play. The host computer device 760 can transmit to the peripheral device all the necessary files for initializing the game to the saved state. In one embodiment, the peripheral computing device 114B can execute the software application locally, after a swap, on the peripheral computing device 114B by using the initialization information.

In one embodiment, a remote server can stream the game space GUI generated by the gaming application to the host computing device 760, and the virtual peripheral control GUI to the peripheral computing device 114B. In this embodiment, the gaming application can be executed by the remote server. The gaming application can be adapted to determine a swap between GUIs without user input. For example, the gaming application can detect a change in venue, state or other detectable event in the game space. The gaming application can be designed to invoke a switch between GUIs responsive to detecting the change in venue, state or other detectable event in the game space. In this embodiment, the gaming application operating from the remote server can stream the game space GUI to the peripheral computing device 114B, and the virtual peripheral control GUI to the host computing device 760. In this illustration, the peripheral computing device 114B can now be referred to as a host computing device, while the host computing device 760 can now be referred to as a peripheral computing device.

In one embodiment, functions of the AMS application can operate in part at the host computing device 760 and in part at the peripheral computing device 114B. In one embodiment, the gaming application can be executed, in whole or in part, at the host computing device 760, at the peripheral computing device 114B, a remote server, or combinations thereof In one embodiment, method 400 can be adapted to define more than one programmable layer for an accessory. Such a feature can extend the functionality of an accessory into multi-layer paradigms of input functions. The GUI of FIG. 1 can be adapted so that a user can specify more than one programmable layer for a specific accessory.

The user can also specify which layer to present in FIG. 1 while associating actions. If for instance layer 1 is shown, the GUI of FIG. 1 can present the actions associated in this layer by presenting descriptors superimposed on the input functions (e.g., buttons or keys). When the user switches to layer 2 (e.g., by selecting from a drop-down menu the layer of interest) the accessory can be shown in the GUI with a different set of associated actions. The user can define a macro or identify a key sequence to switch between layers when the accessory is in use.

The trigger for switching between layers can be a toggle function (e.g., selecting the tab key on a Qwerty keyboard) to switch between layers in a round robin fashion (layer 1→layer 2→layer 3→to layer 1→and so on). Alternatively, the user can define a hold and release trigger to switch between layers. In this embodiment, the user moves to another layer while pressing a button (e.g., a "Shift" key) and returns to the preceding layer upon its release. In yet another embodiment, the trigger to switch layers can be defined differently per layer. The user can for example select the letter "A" in layer 1 to proceed to layer 2, and select the letter "B" in layer 2 to return to layer 1 or proceed to yet another layer 3. There can be numerous combinations of layers and triggers which can be defined to substantially expand the capability of single accessory. Additionally, triggers can be of any kind, tactile, speech, etc.

In another embodiment, method 400 can be adapted so that a user can define super macros and/or super profiles. A super macro can represent nested macros (combinations of macros). Method 400 can be adapted so that the user can customize the timing for executing nested macros. Similarly, a super profile can represent nested profiles (combinations of profiles). A super profile can for example comprise sub-profiles, each sub-profile defining associations of actions to input functions of a particular accessory.

In yet another embodiment, method 400 can be adapted to establish audio profiles for headset accessories. When a user selects a headset accessory, the GUI 101 can be adapted to provide the user options to establish a sound output (equalizer) setting to optimize performance for a particular gaming application. For instance GUI 101 can present an equalizer so that the user can raise the volume of high frequencies to an enemy's footsteps from a longer distance in a gaming application.

FIG. 10 depicts an exemplary diagrammatic representation of a machine in the form of a computer system 1000 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010 (e.g., a liquid crystal displays (LCD), a flat panel, a solid state display, or a cathode ray tube (CRT)). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020.

The disk drive unit 1016 may include a machine-readable medium 1022 on which is stored one or more sets of instructions (e.g., software 1024) embodying any one or more of the methodologies or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1024, or that which receives and executes instructions 1024 from a propagated signal so that a device connected to a network environment 1026 can send or receive voice, video or data, and to communicate over the network 1026 using the instructions 1024. The instructions 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing device, comprising:
a memory to store executable instructions; and
a processor coupled to the memory, wherein the executable instructions, responsive to execution by the processor, facilitate performance of operations comprising:
presenting a first graphical user interface at a computing device for depicting a game space of a gaming application at a display;
detecting a mobile communication device;
receiving accessory information from the mobile communication device;
determining a plurality of input functions associated with the mobile communication device according to the accessory information;
receiving a detected first stimulation from the mobile communication device, wherein the detected first stimulation is associated with a user selection of a first input function of a first plurality of input functions of a second graphical user interface of the mobile communication device depicting a virtual peripheral controller for capturing user navigation and control inputs for controlling the gaming application from the mobile communication device, wherein the detected first stimulation is received from the mobile communication device by way of a cellular phone communication link, and wherein the user selection of the first input function of the plurality of input functions of the second graphical user interface of the mobile communication device is received at the mobile communication device when the mobile communication device is not physically connected to the computing device, wherein the first plurality of input functions of the virtual peripheral controller are depicted by the second graphical user interface at the mobile communication device in a first format according to a first feature of the mobile communication device;
detecting a first association between the first stimulation and a first substitute action for the first input function;
obtaining first substitute stimulus data defined by the first substitute action responsive to the first association;
replacing the first stimulation with the substitute stimulus data;
transmitting the substitute stimulus data to an operating system for controlling the gaming application;
determining a second feature of the computing device;
determining a difference between the first feature of the mobile communication device and the second feature of the computing device;
detecting a request to swap the first graphical user interface depicting the game space with the second graphical user interface depicting the virtual peripheral controller with the mobile communication device; and
presenting at the display the second graphical user interface depicting the virtual peripheral controller for controlling the gaming application, wherein the first plurality of input functions of the virtual peripheral controller is adapted to a second format according to the difference between the first feature and the second feature responsive to the detecting of the request to swap.

2. The computing device of claim 1, wherein the processor further performs operations comprising streaming the first graphical user interface depicting the game space adapted for presentation at the mobile communication device by way of the cellular phone communication link responsive to the request to swap.

3. The computing device of claim 2, wherein the processor further performs operations comprising transcoding the first graphical user interface to conform to a capability of the mobile communication device.

4. The computing device of claim 2, wherein the processor further performs operations comprising synchronizing the first graphical user interface to a state of the first graphical user interface at a time of the requested swap.

5. The computing device of claim 1, wherein the virtual peripheral controller emulates features representing one of a gaming console controller, a keyboard, a thumb pad or a joystick.

6. The computing device of claim 1, wherein the first graphical user interface depicting the game space comprises a user interface for capturing navigation and control inputs to the gaming application.

7. The computing device of claim 1, wherein the mobile communication device further communicates with the communication device by way of a wireless communication link and a gateway device.

8. The computing device of claim 1, wherein mobile communication device further communicates with the communication device by way of an Internet Protocol communication link.

9. The computing device of claim 1, wherein the processor further performs operations comprising:
recording a sequence of detected stimuli associated with the virtual peripheral controller from the mobile communication device; and
associating the sequence of detected stimuli to a macro corresponding to the first substitute action.

10. The computing device of claim 1, wherein the processor further performs operations comprising executing the gaming application.

11. The computing device of claim 1, wherein a remote server executes the gaming application, wherein the remote server streams the first graphical user interface depicting the gaming space and wherein the remote server streams the second graphical user interface depicting the virtual peripheral controller to the mobile communication device by way of the cellular phone communication link.

12. The computing device of claim 11, wherein the remote server causes the requested swap by redirecting to the mobile communication device the first graphical user interface adapted for presentation at the mobile communication device and redirecting the second graphical user interface depicting the virtual peripheral controller adapted for presentation.

13. The computing device of claim 1, wherein the requested swap is initiated by one of the gaming application or user input.

14. The computing device of claim 1, wherein the requested swap is initiated by the gaming application responsive to an event detected by the gaming application.

15. The computing device of claim 14, wherein the event comprises a change in venue of a video game presented by the gaming application.

16. A non-transitory computer-readable storage medium at a mobile communication device comprising executable instructions, which when executed by a processor facilitate performance of operations comprising:

transmitting accessory information to a computing device that is executing a gaming application, responsive to the computing device detecting the mobile communication device, wherein the computing device determines a first plurality of input functions associated with the mobile communication device according to the accessory information;

presenting a first graphical user interface corresponding to a virtual peripheral controller for capturing user navigation and control inputs, wherein the first plurality of input functions of the virtual peripheral controller are depicted by the first graphical user interface at the mobile communication device in a first format according to a first feature of the mobile communication device;

capturing a detected stimulation associated with a user selection of a first input function of the virtual peripheral controller of the mobile communication device, wherein the stimulation is associated with a substitute action, and wherein the user selection of a first input function of the virtual peripheral controller of the mobile communication device is received at the mobile communication device when the mobile communication device is not physically connected to the computer device;

obtaining substitute stimulus data defined by the substitute action;

replacing the stimulation with the substitute stimulus data associated with the first input function;

transmitting the substitute stimulus data associated with the first input function to the computing device to cause an update in a second graphical user interface depicting a game space, wherein the gaming application generates the game space, wherein the second graphical user interface is updated responsive to the gaming application processing the detected stimulation, wherein the substitute stimulus data is transmitted by way of a wirelesss communication link; and receiving an adaptation of the second graphical user interface from the gaming application responsive to a request to swap the presentation of the game space from the computing device by way of the wirelesss communication link, wherein the computing device presents the virtual peripheral control responsive to the request to swap, and wherein the virtual peripheral controller that is presented by the computing device comprises an adaptation of the first plurality of input functions in a second format according to a difference in features of the mobile communication device and the computing device.

17. The non-transitory computer-readable storage medium of claim 16, wherein the virtual peripheral controller emulates one of a gaming console controller, a keyboard, a thumb pad or a joystick.

18. The non-transitory computer-readable storage medium of claim 16, wherein the executable instructions further cause the processor perform operations comprising transmitting the substitute stimulus data to the computing device executing the gaming application by way of the wireless communication link.

19. The non-transitory computer-readable storage medium of claim 16, wherein the executable instructions further cause the processor perform operations comprising transmitting the substitute stimulus data to a remote server executing the gaming application by way of the wireless communication link, and wherein the remote server is operable to transmit the second graphical user interface to the computing device.

20. The non-transitory computer-readable storage medium of claim 16, wherein the request to swap the presentation of the game space at the computing device is initiated by one of a user input submitted to the gaming application or a gaming event detected by the gaming application.

21. The non-transitory computer-readable storage medium of claim 16, wherein the executable instructions further cause the processor to perform operations comprising transmitting a request to the computing device by way of the wireless communication link to swap the second graphical user interface depicting the game space with the first graphical user interface corresponding to the virtual peripheral controller.

22. The non-transitory computer-readable storage medium of claim 16, wherein the executable instructions further cause the processor to perform operations comprising receiving the adaptation of the second graphical user interface as a stream by way of the wireless communication link from one of the computing device executing the gaming application or a remote server executing the gaming application.

23. A method, comprising:
    detecting, by a system comprising a processor, a mobile communication device;
    receiving, by the system, accessory information from the mobile communication device;
    determining, by the system, a plurality of input functions associated with the mobile communication device according to the accessory information;
    presenting, by the system, at a display a first graphical user interface depicting a game space generated by a gaming application;
    receiving, by the system, substitute stimulus data associated with a user selection of the plurality of input functions from the mobile communication device by way of a wireless communication link, wherein the substitute stimulus data is associated with a second graphical user interface depicting a virtual peripheral controller presented at the mobile communication device for capturing control information for controlling the gaming application from the mobile communication device, wherein the substitute stimulus data replaces a stimulation that is detected at the mobile communication device, wherein the substitute stimulus data is defined by a substitute action that is associated with the stimulation, and wherein the user selection of the plurality of input functions that are arranged in a first format according to a first feature at the mobile communication device is received at the mobile communication device when the mobile communication device is not physically connected to the system;
    detecting, by the system, a request to swap presentations of the first graphical user interface depicting the game space and the second graphical user interface depicting the virtual peripheral controller to the mobile communication device, wherein the request to swap is received from the mobile communication device by way of the wireless communication link; and
    presenting, by the system, at the display an adaptation of the second graphical user interface depicting the virtual peripheral controller responsive to the request to swap, wherein the second graphical user interface arranges the input functions according to a difference between the first feature of the mobile communication device and a second feature of the system.

24. The method of claim 23, comprising transmitting, by the system, a stream associated with the first graphical user interface depicting the game space to the mobile communication device by way of the wireless communication link for presentation at the mobile communication device responsive to the request to swap.

25. The method of claim 23, wherein the first graphical user interface depicting the game space is devoid of navigation and control inputs.

26. The method of claim 23, further comprising facilitating, by the system, communications with the mobile communication device by way of a gateway device.

27. The method of claim 23, wherein the gaming application is executed by one of a computing device, the mobile communication device, or a remote server.

28. The method of claim 23, wherein the request to swap is initiated by one of user input received by the gaming application, or a gaming event detected by the gaming application.

29. The method of claim 23, comprising presenting, by the system, at the display a third graphical user interface depicting a second virtual peripheral for capturing control information for controlling the gaming application.

30. The method of claim 23, comprising:
    transcoding, by the system, the first graphical user interface to conform to a capability of the mobile communication device responsive to the request to swap; and
    streaming, by the system, the first graphical user interface that is transcoded to the mobile communication device by way of the wireless communication link.

* * * * *